United States Patent

Kadota

Patent Number: 5,988,138
Date of Patent: Nov. 23, 1999

[54] INTER-CYLINDER-INJECTION FUEL CONTROLLER FOR AN INTERNAL COMBUSTION ENGINE

[75] Inventor: Yoichi Kadota, Tokyo, Japan

[73] Assignee: Mitsubishi Denki Kabushiki Kaisha, Tokyo, Japan

[21] Appl. No.: 09/014,651

[22] Filed: Jan. 28, 1998

[30] Foreign Application Priority Data

Oct. 27, 1997 [JP] Japan ................................. 9-294565

[51] Int. Cl.$^6$ ....................................................... F02B 5/02
[52] U.S. Cl. .......................................... 123/305; 123/295
[58] Field of Search .................................. 123/295, 305, 123/436, 478, 406.24

[56] References Cited

U.S. PATENT DOCUMENTS

| | | | |
|---|---|---|---|
| 4,883,038 | 11/1989 | Nakaniwa | 123/436 |
| 5,020,504 | 6/1991 | Morikawa | 123/531 |
| 5,078,107 | 1/1992 | Morikawa | 123/295 |
| 5,875,756 | 3/1999 | Kamura et al. | 123/305 |

FOREIGN PATENT DOCUMENTS

4-187819  7/1992  Japan .

Primary Examiner—Willis R. Wolfe
Assistant Examiner—Mahmoud M. Gimie
Attorney, Agent, or Firm—Sughrue, Mion, Zinn, Macpeak & Seas, PLLC

[57] ABSTRACT

An inter-cylinder-injection fuel controller for an internal combustion engine maintaining stable operation performance at a low cost. The inter-cylinder-injection fuel controller comprises a control unit 8B for controlling the injectors in a mode of the compression stroke injection or in a mode of the intake stroke injection, wherein various sensors 20 include an amount-of-intaken-air sensor and a crank angle sensor, and said control unit includes change-in-the-running-speed suppressing portion 82, 83 for suppressing a change in the running speed caused by a change in the external load in the mode of the compression stroke injection by correcting the amount F of supplying fuel, a rich determining portion 85 for forming a rich signal RC when a target air-to-fuel ratio A/Fo based upon the corrected amount of supplying fuel is on the side more rich than a predetermined lower-limit value α, an air-to-fuel-ratio clipping portion 86 for clipping the controlled air-to-fuel ratio to the lower-limit value in response to the rich signal, an amount-of-deviation operation means for operating the amount of deviation ΔA/F between the lower-limit value and the target air-to-fuel ratio in response to the rich signal, and parameter correction portion 87, 88 for correcting the control parameters toward the direction of increasing the output depending upon the amount of deviation.

4 Claims, 8 Drawing Sheets

INTER-CYLINDER-INJECTION FUEL CONTROLLER FOR AN INTERNAL COMBUSTION ENGINE

BACKGROUND OF THE INVENTION

1. Field of the Invention

The present invention relates to a fuel injection controller used for engines of ordinary automobiles, such as an inter-cylinder-injection fuel controller for controlling the torque produced by an engine by directly injecting the fuel into the cylinders. Particularly, the invention relates to an inter-cylinder-injection fuel controller for an internal combustion engine, which improves combustion and maintains operability without driving up the cost by correcting control parameters by clipping the air-to-fuel ratio to a lower-limit value, in order to suppress fluctuation in the engine running speed when an external load is exerted.

2. Prior Art

In internal combustion engines used for automobiles, in general, the fuel injectors are installed in an intake manifold of an intake pipe, so that the fuel is supplied into the cylinders together with the intaken air.

Figure 7:
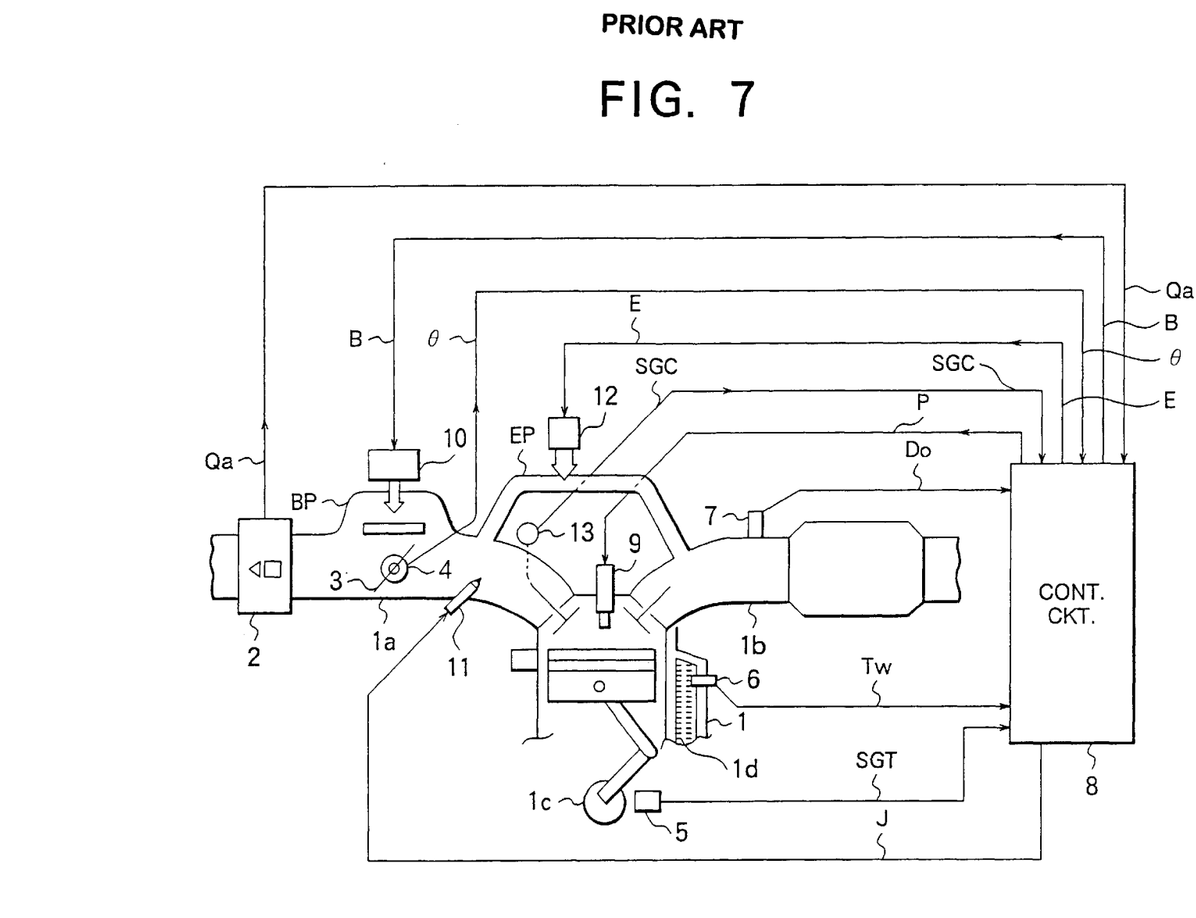
FIG. 7 is a diagram illustrating the constitution of a conventional fuel controller for an internal combustion engine based on a system for injecting fuel into the intake pipe.

FIG. 7 is a diagram illustrating the constitution of a conventional fuel controller for an internal combustion engine having injectors provided in the intake pipe.

In FIG. 7, an internal combustion engine 1 is constituted by a plurality of cylinders. Here, only one cylinder is shown for simplicity.

An intake pipe 1a and an exhaust pipe 1b are communicated with a combustion chamber of the engine 1, and a crank shaft 1c is coupled to an end of the engine 1.

The intake pipe 1a supplies the intaken air and fuel to the engine 1, and the exhaust pipe 1b exhausts exhaust gases after burned in the engine 1. The crank shaft 1c rotates being linked to the engine 1. The cooling water 1d surrounding the periphery of the engine 1 cools the engine 1.

An air flow sensor 2 provided in an inlet port of the intake pipe 1a measures the amount of the air intaken by the engine 1 as amount-of-intaken-air data Qa.

A throttle valve 3 provided in the intake pipe 1a is opened and closed being interlocked to an accelerator pedal (not shown) operated by a driver, to adjust the amount Qa of the air intaken by the engine 1.

A throttle opening sensor 4 provided for the throttle valve 3 detects a position of the throttle valve 3, i.e., detects a throttle opening degree θ.

A crank angle sensor 5 provided in relation to the crank shaft 1c outputs a pulse signal or a crank angle signal SGT in synchronism with the revolution of the crank shaft 1c. The crank angle signal SGT represents the running speed data of the engine 1 and the angular position data of the crank shaft 1c.

A water temperature sensor 6 for detecting the temperature Tw of the cooling water 1d works as a means for detecting the warmed-up state of the engine 1.

An oxygen sensor 7 provided in the exhaust pipe 1b detects the oxygen concentration Do in the exhaust gases exhausted from the engine 1 into the exhaust pipe 1b.

A control circuit 8 constituted by a microcomputer receives data (Qa, θ, SGT, Tw, Do, etc.) detected by various sensors mounted on various peripheral portions of the engine, outputs drive control signals to various actuators (spark plugs and injectors that will be described later) depending upon the operation conditions, and executes a variety of sequence drive control operations (ignition timing control operation and fuel injection control operation) for each of the cylinders of the engine 1. Thus, the engine 1 is driven by combustion at desired ignition timings and at a desired air-to-fuel ratio.

A spark plug 9 provided in the combustion chamber in the cylinder of the engine 1 is driven by a spark control signal P from the control circuit 8.

A by-pass passage BP is so provided for the intake pipe 1a as to by-pass the throttle valve 3.

An air by-pass valve 10 provided in the by-pass passage BP is driven by a by-pass control signal B from the control circuit 8, opens and closes the by-pass passage BP so as to adjust the amount of the air by-passing the throttle valve 3, thereby to control the torque while the vehicle is running and to control the running speed of the engine during the idling operation (when the throttle valve 3 is fully closed).

An injector 11 is mounted in the intake manifold at a position on-the downstream side of the intake pipe 1a, and is driven by an injection control signal J from the control circuit 8 to supply fuel into the engine 1.

An EGR (exhaust gas reflux) pipe EP communicating the intake pipe 1a with the exhaust pipe 1b sends the exhaust gases exhausted from the engine back again to the combustion chamber so as to burn the exhaust gases again in order to decrease harmful NOx.

An EGR valve 12 provided in the EGR pipe EP is driven by an EGR control signal E from the control circuit 8 to control the amount of the exhaust gases refluxed into the intake pipe 1a from the exhaust pipe 1b.

A cylinder identifying sensor 13 attached to the cam shaft of the engine 1 sends, to the control circuit 8, a cylinder identifying signal SGC for identifying the cylinder in which the combustion is taking place in synchronism with the operation of the intake valve of the engine 1.

Detection signals Qa, θ, SGT, Tw, Do and SGC obtained from the sensors 2, 4 to 7 and 13 are input to the control circuit 8. Actuators 9 to 12 are driven by control signals P, B, J and E output from the control circuit 8.

In a conventional device constituted as shown in FIG. 7, when an injection control signal J is output from the control circuit 8, the injector 11 is driven depending upon the drive pulse width of the injection control signal J, and the fuel of an amount corresponding to the injection control signal J is injected into the intake pipe 1a.

When the fuel is injected on the outside of the cylinder, however, the fuel partly adheres onto the inner walls of the intake pipe 1a and onto the intake valves of the engine before it is intaken into the cylinder of the engine 1. The fuel adheres particularly when the temperature is low (at the start of the operation) in which the fuel is less vaporized or during a transient operation condition where a response for the amount of fuel is required, resulting in the emission of exhaust gases containing harmful components in large amounts.

Therefore, there has heretofore been proposed an inter-cylinder-injection fuel controller for directly injecting fuel into the cylinders of the engine.

The inter-cylinder-injection fuel controller is drawing attention as an ideal engine, and offers the following effects (1) to (4) when it is used for a gasoline engine for general automobiles.

(1) Reducing the amount of toxic gases in the exhaust gases.

The fuel is directly injected near the spark plug 9 (see FIG. 7) in the combustion chamber. Therefore, the air-tofuel ratio can be decreased (lean burn) without the need of taking a delay in the transportation of fuel into consideration, making it possible to reduce the amounts of toxic HC gas and CO gas.

(2) Improving the fuel efficiency.

The fuel is injected depending upon the ignition timing just before the ignition. Therefore, an inflammable fuel is formed around the spark plug 9 at the time of ignition, and the distribution of the mixture gas containing fuel becomes nonuniform, making it possible to establish a stratified combustion. This makes it possible to greatly decrease the apparent air-to-fuel ratio (to make the air-to-fuel ratio lean) of the amount of the supplied fuel to the amount of the air intaken into the cylinder of the engine 1.

Owing to the stratified combustion, furthermore, the EGR (exhaust gas reflux) that is effected in large amounts does not so much adversely affect the combustion, making it possible to increase the amount Qa of the intaken air. Therefore, the pumping loss decreases and the fuel efficiency is improved.

(3) Increasing the output of the engine 1.

The mixture air concentrates around the ignition plug 9 and, hence, the end gas (mixture gas in a region remote from the spark plug 9) which causes knocking decreases. Owing to the stratified combustion, therefore, knocking occurs less, and the compression ratio of the engine 1 can be heightened.

Furthermore, the fuel vaporizes in the cylinder, and the vaporized fuel robs the air in the cylinder of the heat of vaporization. Therefore, the density of the intaken air increases, the volume efficiency increases, and the engine 1 produces an increased output.

(4) Improving the controllability.

Since the fuel is directly injected into the cylinder, the time delay is shortened from when the fuel is supplied until when the engine 1 produces an output by burning the fuel compared with the case of the device of FIG. 7. This makes it possible to realize an engine that quickly responds to the request of a driver.

In the inter-cylinder-injection fuel controller, there exist a lean operation mode in which the fuel is supplied in a very small amount during the compression stroke to establish a very lean stratified combustion to improve emission and fuel efficiency, and a stoichiometric operation mode in which the fuel is supplied in a required amount during the intake stroke to produce an increased output relying upon the combustion of an ordinary homogeneous mixture gas.

In the mode of the compression stroke injection (lean operation), the operation is carried out on the lean side compared with the mode of the intake stroke injection (stoichiometric operation). Therefore, the air Qa must be supplied in an increased amount to the engine 1 relative to a given throttle opening degree θ (accelerator opening degree). Therefore, the amount Qa of the intaken air that is usually controlled by the acceleration work only by the driver must be increased by another system.

Figure 8:
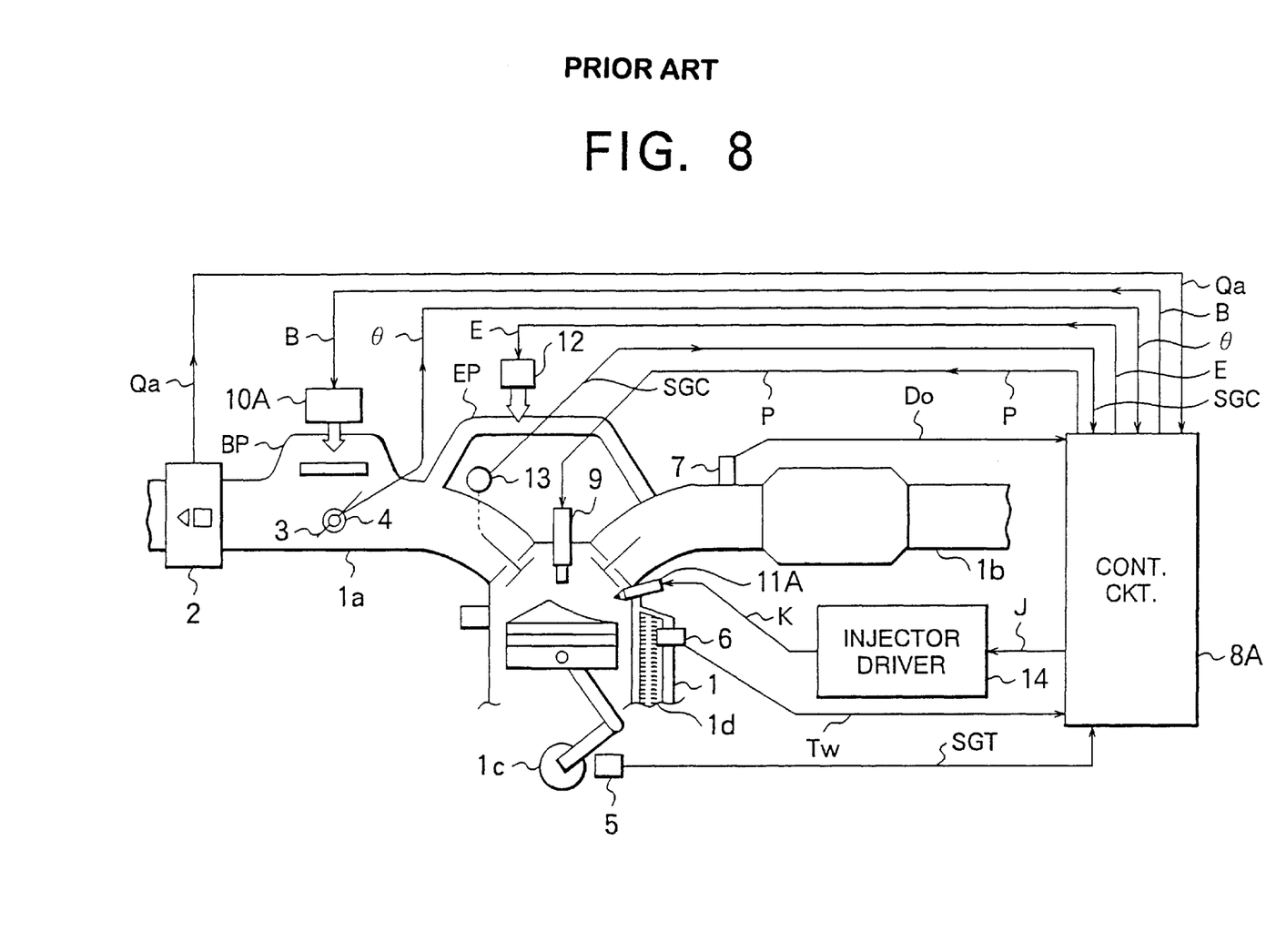
FIG. 8 is a diagram illustrating the constitution of a general inter-cylinder-injection fuel controller for an internal combustion engine.

FIG. 8 is a diagram illustrating the constitution of a conventional inter-cylinder-injection fuel controller of an internal combustion engine disclosed in, for example, Japanese Patent Laid-Open (Kokai) No. 187819/1992, and wherein the same constituent elements as those mentioned above are denoted by the same reference numerals but their description is not repeated.

This publication introduces a countermeasure on the side of the body of the engine 1 in order to improve combustion.

In FIG. 8, the control circuit 8A operates, for example, the amount of supplying fuel and the injection timing, outputs an injection control signal J depending upon the operated result, drives the injector 11A during at least either the intake stroke or the compression stroke, thereby to inject the fuel. Here, a cylinder to be controlled is identified based on a cylinder identifying signal SGC, to control the injector 11A of each of the cylinders.

The injector 11A is not mounted in the intake pipe 1a but is directly mounted in the combustion chamber of a cylinder of the engine 1, and has been designed to operate at high speeds and under high pressures, in order to inject a high-pressure fuel within a short period of time during the intake stroke or the compression stroke.

An injector driver 14 inserted between the control circuit 8A and the injector 11A converts the injection control signal J from the control circuit 8A into an injection control signal K for high-speed and high-pressure operation to thereby drive the injector 11A.

In response to the injection control signal J from the control circuit 8A, the injector driver 14 outputs an injection control signal K of an amplified large electric power to inject the fuel with a pressure overcoming the pressure in the cylinder.

The air by-pass valve 10A works to control the torque during the lean operation inclusive of when the vehicle is running in addition to controlling the running speed of the engine during the idling condition in which the throttle valve 3 is fully closed, and has been so designed as to increase the range for controlling the amount of the intaken air through the by-pass passage.

Described below is the operation of the conventional inter-cylinder-injection fuel controller for an internal combustion engine shown in FIG. 8.

In the inter-cylinder-injection device as described above, a stratified combustion (ultra-lean mode) control operation is carried out to supply fuel into the cylinder (compression stroke injection) just before the ignition, and the air-to-fuel ratio A/F has been controlled to be not smaller than 30 which is on the ultra-lean side. However, the air-to-fuel ratio in the practical combustion portion is close to a stoichiometric air-to-fuel ratio (14.7).

Unlike the lean combustion (intake stroke injection mode in which the intaken air and the fuel are homogeneously mixed together and, then, the mixture gas is burned at an air-to-fuel ratio of about 20) in the conventional device shown in FIG. 7, therefore, the operation is carried out near the air-to-fuel ratio of 16 (at which NOx is emitted in large amounts). Therefore, the EGR is introduced in large amounts to suppress the emission of NOx.

In the inter-cylinder-injection fuel controller of FIG. 8 as described above, the stratified combustion that is realized based upon injecting the fuel and finely controlling the ignition timing, is combined with the introduction of EGR in large amounts that tends to deteriorate the combustion in the engine 1, in order to establish a lean combustion by the injection in the compression stroke.

In the operation mode in which a large engine output is required such as during the acceleration, on the other hand, a homogeneous-mixture combustion is executed like in the conventional engine of FIG. 7 based upon the stoichiometric (rich) combustion by the injection in the intake stroke.

When the operation condition changes from the state of injection in the compression stroke (ultra-lean combustion) to the state of injection in the intake stroke (rich operation), in general, not only the air-to-fuel ratio and the EGR amount are corrected but also the fuel injection timing and the ignition timing are corrected. In this case, furthermore, the air by-pass valve 10A is controlled to decrease the amount Qa of the intaken air in order to suppress a change in the torque (increase of output) caused by a change from the lean fuel to the rich fuel.

When the air-to-fuel ratio is instantaneously shifted into a rich value, furthermore, a shock is generated due to a change in the torque. To prevent this, in general, the air-to-fuel ratio is gradually lowered, by a transient control called tailing mode, down to an air-to-fuel ratio at which the combustion takes place in the mode of the compression stroke injection (lean), which is then changed into the mode of the intake stroke injection to make the air-to-fuel ratio more rich.

In shifting the operation mode (tailing mode) as described above, however, when an external load is exerted in a state where the air-to-fuel ratio is rendered to be rich to such an extent at which the combustion can take place, deterioration in the combustion must be avoided; i.e., it is not almost allowed to render the air-to-fuel ratio to become rich. Therefore, it becomes difficult to effect the correction against a change in the torque caused by the external load.

In the lean operation mode in which an ultra-lean stratified combustion is established by supplying the fuel in the compression stroke, on the other hand, there exists a correlation between the output of the engine 1 and the amount of supplying the fuel. Therefore, when the external load is exerted on the engine 1 and the engine running speed has dropped, a change in the running speed can be suppressed by rendering the air-to-fuel ratio A/F to be rich.

In the conventional engine, furthermore, it has been proposed to suppress a change in the running speed by correcting, for example, the ignition timing. In the compression stroke injection mode, however, a change in the ignition timing causes a change in the phase relative to the fuel injection timing resulting in a change in the state of combustion. That is, the correction is not possible relying upon the ignition timing and, hence, a change in the running speed is suppressed by correcting the fuel.

When the air-to-fuel ratio is rendered to be too rich in the mode of the compression stroke injection, however, the combustion loses stability. In order to suppress the change in the running speed caused by the external load, therefore, when the air-to-fuel ratio is rendered to be rich so as to plunge into a region of unstable combustion, then, the change in the running speed may further increase due to more unstable combustion.

In the conventional inter-cylinder-injection fuel controller for an internal combustion engine as described above, the air-to-fuel ratio is rendered to be rich to suppress a change in the running speed when the external load is exerted. Therefore, a change in the running speed is further promoted when the air-to-fuel ratio has plunged into a region of unstable combustion.

SUMMARY OF THE INVENTION

The present invention was accomplished in order to solve the above-mentioned problem, and its object is to provide an inter-cylinder-injection fuel controller for an internal combustion engine, which suppresses a change in the running speed caused by unstable combustion, suppresses the change in the running speed caused by the external load relying upon the air-to-fuel ratio, clips the air-to-fuel ratio to a lower-limit value, increases the engine torque by rendering the air-to-fuel ratio to be rich when the external load is exerted during the injection in the compression stroke, clips the enrichment within a range in which the combustion takes place stably, and compensates a lack by correcting the control parameters (ignition timing, fuel injection timing, amount of the intaken air, etc.), in order to maintain stable operation at a low cost.

Furthermore, when the mode of the compression stroke injection is shifted to the mode of the intake stroke injection, the air-to-fuel ratio exceeds a range of stable combustion based on the injection in the compression stroke being caused by the time. It is, therefore, another object of the present invention to provide an inter-cylinder-injection fuel controller for an internal combustion engine, which stabilizes the combustion without clipping the air-to-fuel ratio or without correcting the control parameters.

An inter-cylinder-injection fuel controller for an internal combustion engine according to the present invention comprises:

various sensors for outputting data representing operation conditions of the internal combustion engine;

injectors for directly injecting the fuel into the cylinders of the internal combustion engine; and a control unit for operating the amounts of fuel supplied into the cylinders based upon the operation conditions and for controlling the injectors in a mode of the compression stroke injection or in a mode of the intake stroke injection based upon the amounts of supplying fuel; wherein said various sensors include an amount-of-intaken-air sensor for outputting data that corresponds to the amount of the air intaken by the internal combustion engine, and a crank angle sensor for outputting data that correspond to the running speed of the internal combustion engine and to the crank angle; and said control unit includes:

a change-in-the-running-speed suppressing means for suppressing a change in the running speed caused by a change in the external load in the mode of the compression stroke injection by correcting the amount of supplying fuel;

a rich determining means for forming a rich signal when a target air-to-fuel ratio based upon the corrected amount of supplying fuel is on the side more rich than a predetermined lower-limit value;

an air-to-fuel-ratio clipping means for clipping the controlled air-to-fuel ratio of the internal combustion engine to the lower-limit value in response to the rich signal;

an amount-of-deviation operation means for operating the amount of deviation between the lower-limit value and the target air-to-fuel ratio in response to the rich signal; and a parameter correction means for correcting control parameters of the internal combustion engine toward the direction of increasing the output depending upon the amount of deviation.

In the inter-cylinder-injection fuel controller for the internal combustion engine according to the present invention, the control parameters include at least any one of an ignition timing for the internal combustion engine, a timing for driving the injector or an amount of the intaken air.

In the inter-cylinder-injection fuel controller for the internal combustion engine according to the present invention, the control unit invalidates the air-to-fuel-ratio clipping means and the parameter correction means in a tailing mode just after the mode of the compression stroke injection is shifted to the mode of the intake stroke injection.

In the inter-cylinder-injection fuel controller for the internal combustion engine according to the present invention, furthermore, the control unit sets a first threshold value corresponding to an air-to-fuel-ratio region in which the combustion loses stability and a second threshold value which is on the side more rich than the first threshold value, and, when the target air-to-fuel ratio has suddenly changed from the first threshold value to the rich side due to a change in the external load in a tailing mode of the compression stroke injection, instantaneously shifts the tailing mode of the compression stroke injection to a tailing mode of the intake stroke injection, and sets the controlled air-to-fuel ratio to the side more rich than the second threshold value.

DETAILED DESCRIPTION OF THE EMBODIMENTS

Embodiment 1

An embodiment 1 of the present invention will now be described with reference to the drawings.

Figure 1:
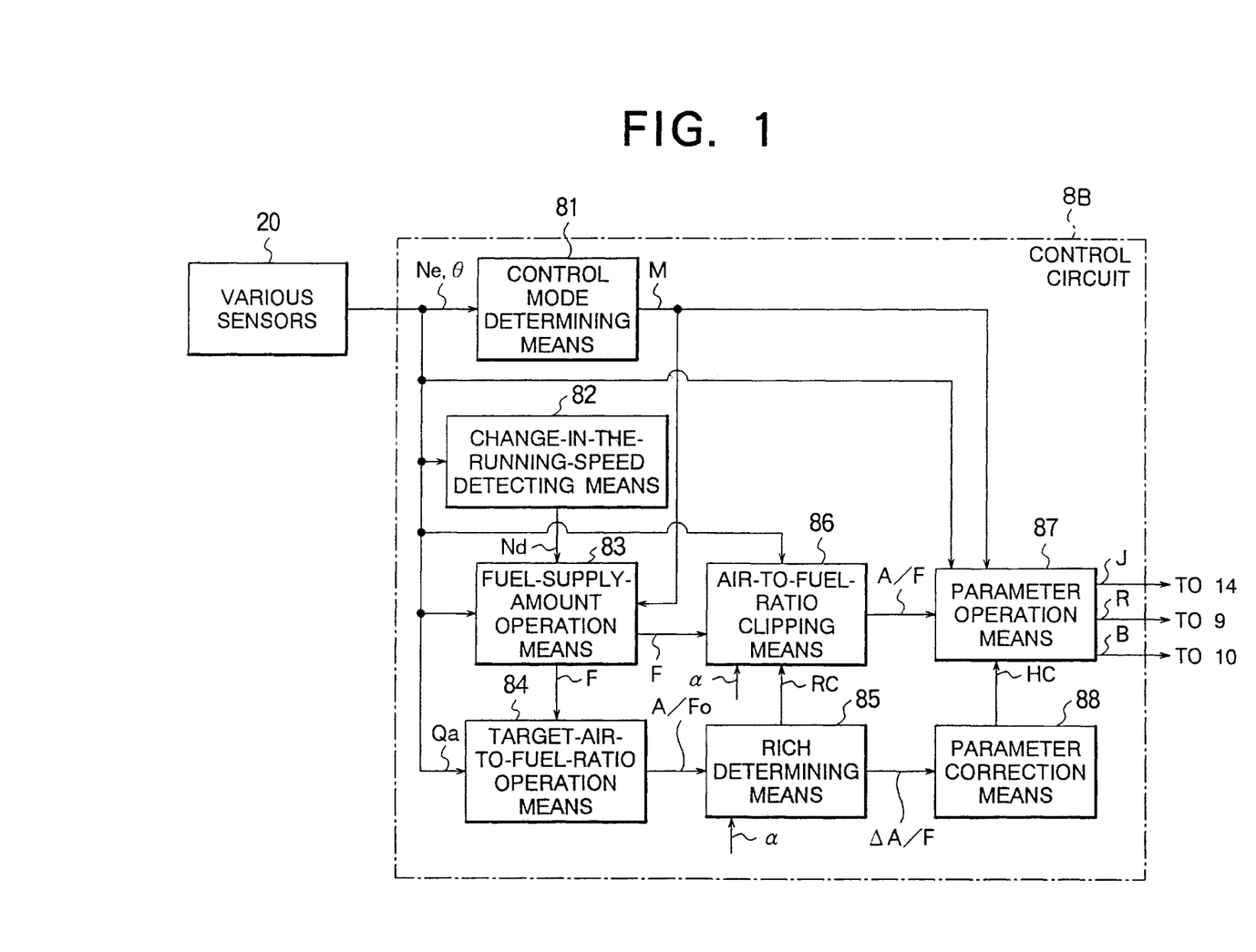
FIG. 1 is a functional block diagram illustrating a control circuit according to an embodiment 1 of the present invention.

FIG. 1 is a functional block diagram illustrating a control circuit 8B according to an embodiment 1 of the present invention, and wherein the constitution that is not shown complies with the one shown in FIG. 8.

Here, conveniently, each block is shown in a manner of being processed in parallel. In practice, however, it needs not be pointed out that each block is processed in a serial manner in synchronism with a crank angle signal SGT as shown in a flow chart (described later) of FIG. 2.

In FIG. 1, various sensors 20 include the above-mentioned (see FIG. 8) amount-of-intaken-air sensor 2, throttle opening degree sensor 4, crank angle sensor 5 and water temperature sensor 6, and sends a variety of detection signals, as data representing the operation conditions, to a control circuit 8B.

Moreover, various sensors 20 include operation switches for external load such as of power-assisted windows, and the operation detection signal may be input, as operation condition data, to the control circuit 8B.

The control circuit 8B includes a control mode determining means 81 for determining the control mode M based upon the operation conditions, a change-in-the-running-speed detecting means 82 for detecting a change Nd in the running speed depending upon the operation conditions, and a fuel-supply-amount operation means 83 for operating the amount F of supplying fuel based upon the operation conditions and the control mode M.

In cooperation with the change-in-the-running-speed detecting means 82, the fuel-supply-amount operation means 83 constitutes a change-in-the-running-speed suppressing means for suppressing a change Nd in the running speed caused by a change in the external load in the mode of the compression stroke injection by correcting the amount F of supplying fuel.

The control circuit 8B is equipped with a target-air-to-fuel-ratio operation means 84 for operating a target air-to-fuel ratio A/Fo based upon the operation condition (amount Qa of the intaken air) and the amount F of supplying fuel, and a rich determining means 85 for determining a rich state by comparing the target air-to-fuel ratio A/Fo with a predetermined lower-limit value $\alpha$.

The rich determining means 85 forms a rich signal RC when the target air-to-fuel ratio A/Fo based on the corrected amount F of supplying fuel is on the side more rich than the lower-limit value $\alpha$. The rich determining means 85 further includes an amount-of-deviation operation means for operating an amount of deviation $\Delta A/F$ between the target air-to-fuel ratio A/Fo and the lower-limit value $\alpha$ in response to the rich signal RC, and outputs the amount of deviation $\Delta A/F$ simultaneously with the rich signal RC.

The control circuit 8B further includes an air-to-fuel clipping means 86 for clipping the controlled air-to-fuel ratio A/F to the lower-limit value $\alpha$ in response to the amount F of supplying fuel and the rich signal RC, a parameter operation means 87 inclusive of an injector control means for outputting an injection control signal J depending upon the controlled air-to-fuel ratio A/F, and a parameter correction means 88 for correcting the control parameters of the internal combustion engine toward the direction of increasing the output depending upon the amount of deviation $\Delta A/F$.

The parameter operation means 87 operates not only the injection control signal J for the injector 11A but also various control parameters corresponding to the operation conditions of the engine 1 and to the control mode M, and outputs an ignition signal P for the spark plug 9 and a by-pass control signal B for the air by-pass valve 10A.

A parameter correction signal HC output from the parameter correction means 88 in response to the amount of deviation $\Delta A/F$ is input to the parameter operation means 87. The control parameter to be corrected by the parameter correction signal HC includes at least any one of an ignition timing for the engine 1, a timing for driving the injector 11A or an amount Qa of the intaken air.

Functions of the means 81 to 86 and 87 in the control circuit 8B may be included in the parameter operation means 87.

The control sequence operation of the embodiment 1 of the invention shown in FIG. 1 will now be described with reference to the flow chart of FIG. 2, timing chart of FIG. 3, characteristics diagram of FIG. 4 and the above-mentioned FIG. 8.

Figure 4:
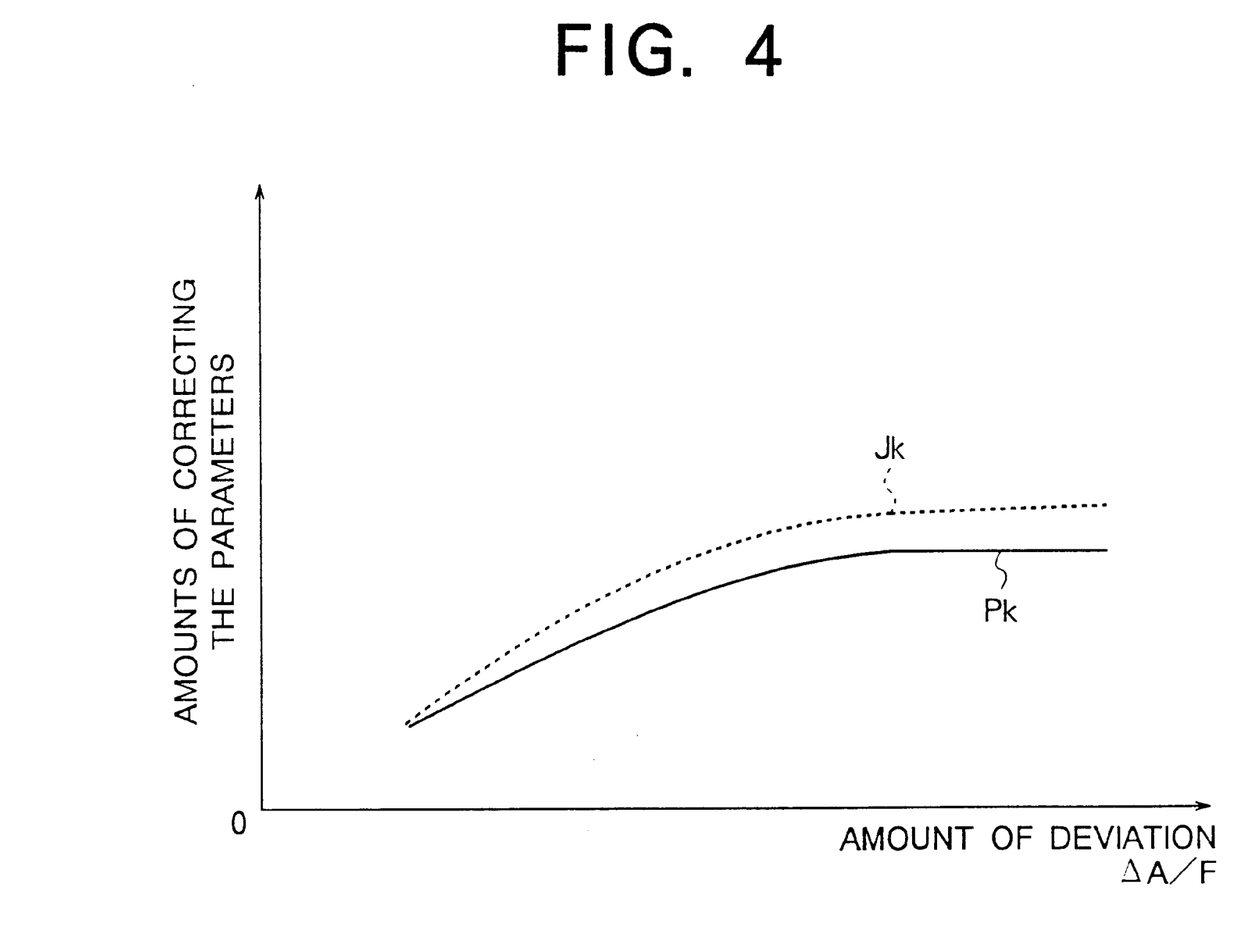
FIG. 4 is a diagram of a two-dimensional map for calculating an amount of correction by a parameter correction means (step S11 in FIG. 2) of FIG. 1.

FIG. 4 illustrates a relationship between the amount of deviation $\Delta A/F$ and the amount of correcting the parameters, and wherein a broken line Jk represents the amount of correcting the fuel injection timing, and a solid line Pk represents the amount of correcting the ignition timing.

Figure 2:
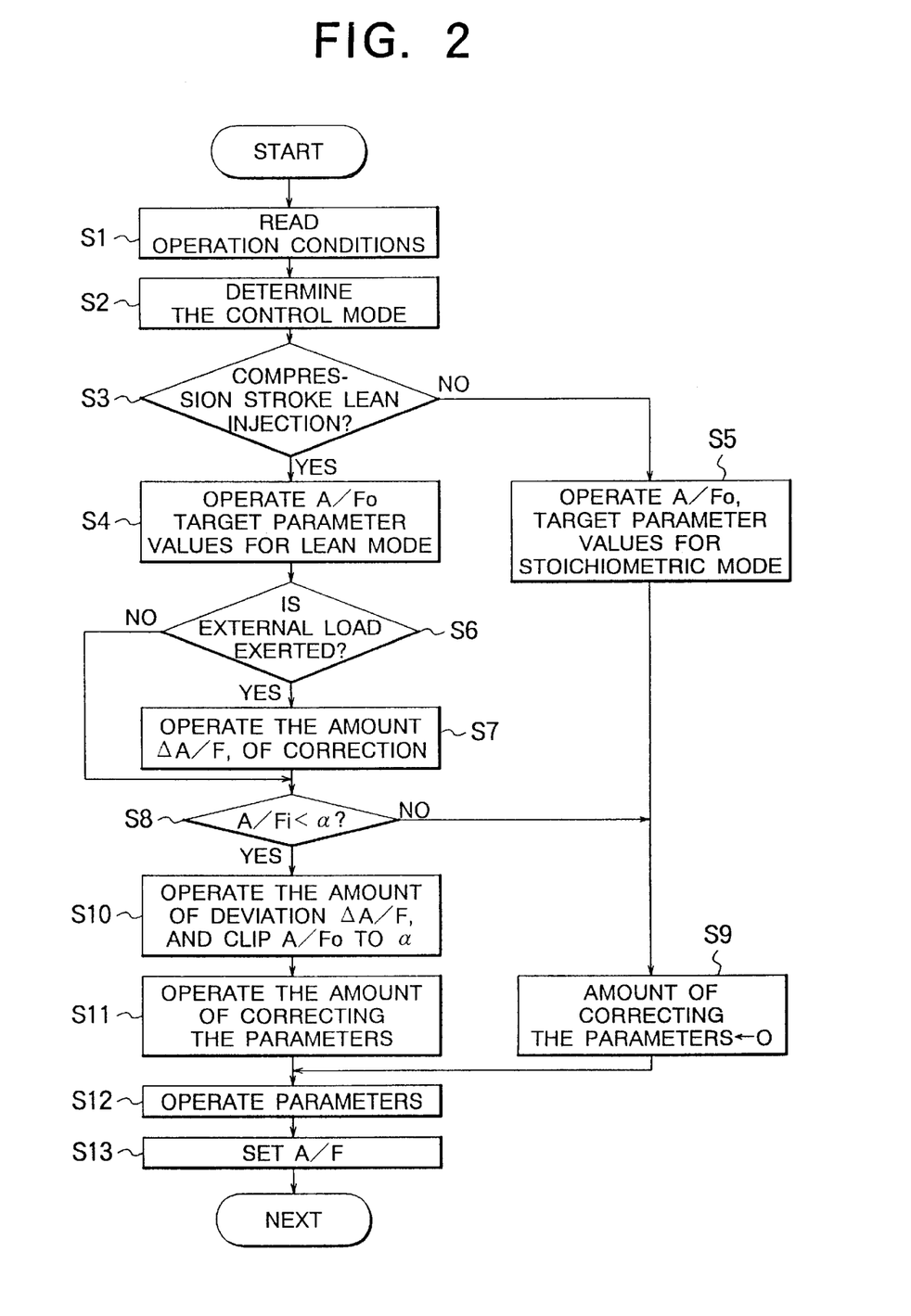
FIG. 2 is a flow chart illustrating a control sequence operation according to the embodiment 1 of the present invention.

Referring to FIG. 2, first, the control mode determining means 81 in the control circuit 8B reads various sensor signals representing the data of operation conditions, i.e., reads a throttle opening degree $\theta$, an engine running speed Ne, an amount Qa of the intaken air, and a cooling water temperature Tw (step S1), and determines a control mode based upon the operation conditions (step S2).

That is, in order to determine whether the present operation condition is in the mode of the intake stroke injection (rich or stoichiometric mode) or in the mode of the compression stroke injection (lean mode), the control mode determining means 81 determines whether, for example, a lean mode is being assumed (step S3).

During, for example, the steady running condition which is neither the acceleration nor the deceleration transient condition, the control mode determining means 81 outputs a control mode M in which the lean operation can be carried out, i.e., outputs the lean mode.

When it is determined at the step S3 that the lean mode is being assumed (i.e., YES) inclusive of a tailing mode of the compression stroke injection, then, the fuel-supply-amount operation means 83, target-air-to-fuel-ratio operation means 84 and parameter operation means 87 operate a target air-to-fuel ratio A/Fo and a target ignition (and fuel injection) timing as target parameter values for the lean mode (step S4). The program then proceeds to a step S6.

When it is determined that the rich or stoichiometric mode is being assumed (i.e., NO), the target air-to-fuel ratio A/Fo and the target ignition (and fuel injection) timing are operated as target parameter values for the stoichiometric mode (step S5). The program then proceeds to a step S9.

At the step S6 that follows the operation of target values of control parameters in the lean mode (step S4), the target-air-to-fuel-ratio operation means 84 determines whether the external load is exerted or not relying upon an operation switch or a change Nd in the engine running speed Ne.

When it is determined that the external load is exerted (i.e., YES), the target-air-to-fuel-ratio operation means 84 operates an amount $\Delta AF1$ for correcting the air-to-fuel ratio toward the rich side depending upon the external load (step S7). The program then proceeds to a step S8.

Figure 3:
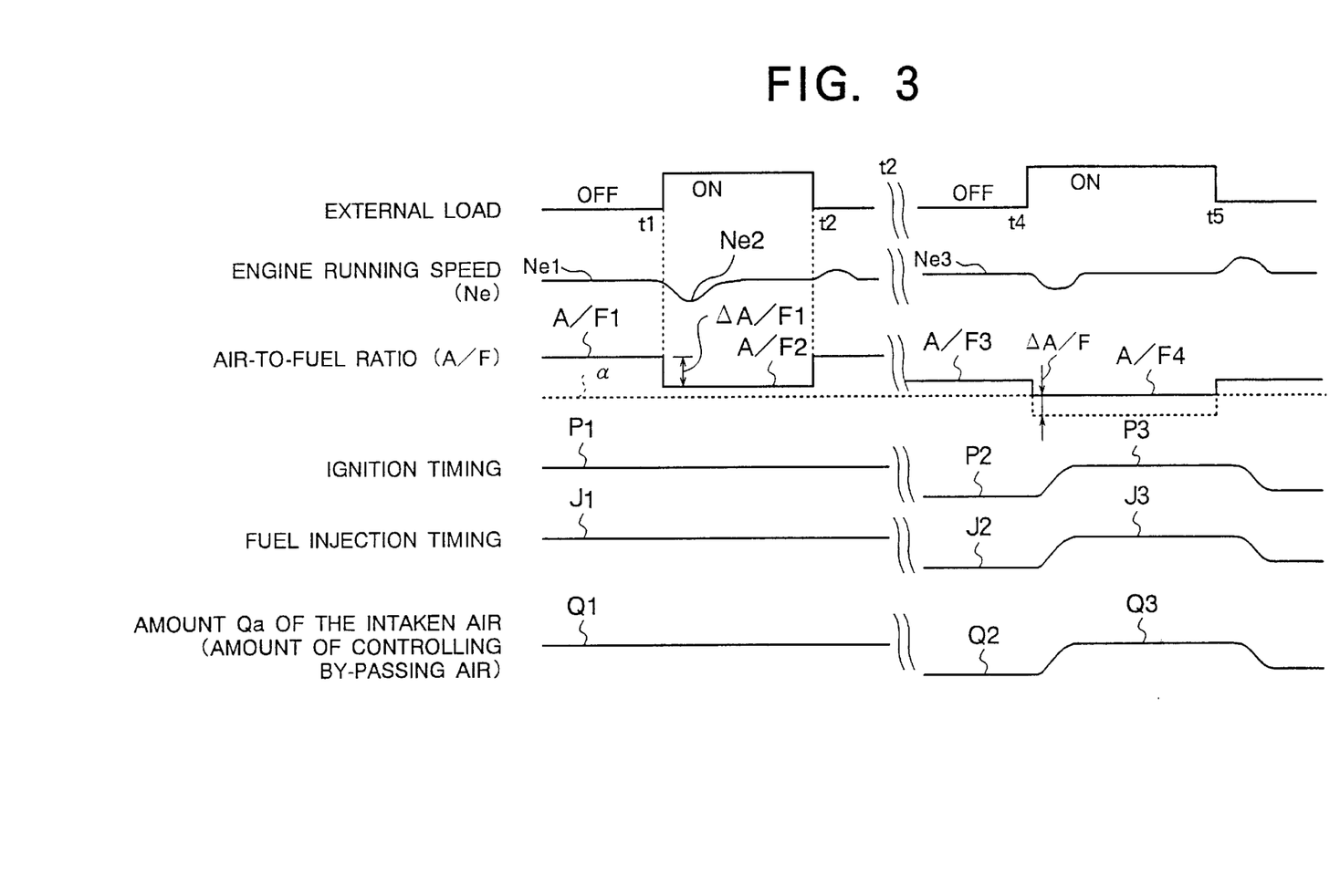
FIG. 3 is a timing chart for explaining the control sequence operation according to the embodiment 1 of the present invention.

When the external load is exerted at, for example, a time t1 in FIG. 3, the target-air-to-fuel-ratio operation means 84 sets a target air-to-fuel ratio A/Fo at A/F2 which is decreased (enriched) from the initial value A/F1 by the amount $\Delta A/F1$ for correcting the air-to-fuel ratio.

On the other hand, when it is determined at the step S6 in FIG. 2 that the external load has not been exerted (i.e., NO), the program proceeds to the step S8.

The rich determining means 85 determines at the step S8 whether the corrected target air-to-fuel ratio A/Fi is more rich (smaller) than a predetermined lower-limit value $\alpha$.

When it is determined that the target air-to-fuel ratio A/Fi on the side more lean than the lower-limit value $\alpha$ and that A/Fi$\geq\alpha$ (i.e., NO), then, the program proceeds to a step S9.

When it is determined that the target air-to-fuel ratio A/Fi is on the side more rich than the lower-limit value $\alpha$ and that A/Fi<$\alpha$ (i.e., YES), then, the rich determining means 85 outputs a rich signal RC and the amount of deviation $\Delta A/F$. The program then proceeds to a step S10.

When the desired air-to-fuel ratio A/Fi is not smaller than the lower-limit value $\alpha$ in the stoichiometric mode or in the lean mode, the rich determining means 85 forms no rich signal RC.

In this case, the parameter correction means 88 does not form parameter correction signal HC, and the amount of correcting the control parameters (ignition timing, fuel injection timing, etc.) of the engine 1 is cleared to zero at the step S9. The program then proceeds to a step S12.

When the air-to-fuel ratio A/F2 is larger than the lower-limit value $\alpha$ (on the lean side) as in a period of from t1 to t2 in which the external load is exerted as shown in FIG. 3, the parameter operation means 87 executes the operation depending upon the corrected target air-to-fuel ratio A/Fo after the external load is exerted, and corrects none of the ignition control signal P, injection control signal J or by-pass control signal B concerning the ignition timing P1, fuel injection timing J1 and amount Q1 of the intaken air.

On the other hand, when the corrected target air-to-fuel ratio A/Fi after the external load is exerted is on the side more rich than the lower-limit value $\alpha$ the rich determining means 85 forms the rich signal RC at the step S10, and operates the amount of deviation $\Delta A/F$ (=A/Fi–$\alpha$).

At the step S10, furthermore, the air-to-fuel ratio clipping means 86 clips the target air-to-fuel ratio A/Fo to the lower-limit value $\alpha$ in response to the rich signal RC and regards it to be the controlled air-to-fuel ratio A/F.

Then, the parameter correction means 88 operates the amount of correcting the control parameters (step S11) in response to the amount of deviation $\Delta A/F$, and inputs the parameter correction signal HC representing the amount of correction to the parameter operation means. Then, the program proceeds to the step S12.

In response to the parameter correction signal HC determined depending upon the amount of deviation $\Delta A/F$, the parameter operation means 87 corrects the control parameters at the step S12. The parameter operation means 87 further sets a finally controlled air-to-fuel ratio A/F (step S13), and the processing routine of FIG. 2 ends.

When, for example, the target air-to-fuel ratio A/F4 corrected from the initial value A/F3 is smaller (on the side more rich) than the lower-limit value $\alpha$ as in a period of from t4 to t5 in which the external load is exerted as shown in FIG. 3, the controlled air-to-fuel ratio is clipped to the lower-limit value $\alpha$.

In this case, the parameter operation means 87 executes the operation in response to the parameter correction signal HC determined depending upon the amount of deviation $\Delta A/F$, and sets the initial values P2, J2 and Q2 of ignition timing, fuel injection timing and amount Qa of the intaken air to the corrected values P3, J3 and Q3.

FIG. 3 shows the case where the ignition timing, fuel injection timing and amount Qa of the intaken air are all corrected simultaneously. Though not shown here, an EGR control signal E (see FIG. 8) may be corrected to adjust the amount of EGR.

As mentioned above, furthermore, the amount of correcting parameters is so set that the output (engine torque) increases with an increase in the amount of deviation $\Delta A/F$. In FIG. 4, for example, the amount Pk of correcting the ignition timing is corrected toward the side where the angle advances with an increase in the amount of deviation $\Delta A/F$.

When the external load is exerted on the engine 1 while the fuel is being injected in the compression stroke, the inter-cylinder-injection fuel controller controls the injection control signal J that determines the amount F of supplying fuel thereby to correct the air-to-fuel ratio A/F.

Here, when the air-to-fuel ratio A/F is clipped to the lower-limit value $\alpha$, the injection control signal J for determining the fuel injection timing is controlled, the ignition control signal P for determining the ignition timing is controlled, the by-pass control signal B for determining the amount of the by-passing air is controlled, and the EGR control signal E for determining the amount of EGR is controlled, in order to prevent the combustion from being adversely affected and, hence, to maintain operation of the engine 1.

Therefore, when the external load is exerted during the compression stroke injection (lean mode), the operation of the engine 1 can be maintained at a low cost.

Besides, since the operation performance of the engine 1 can be improved on the side of the control circuit 8B irrespective of a change in the external load, no particular constituent elements need be added.

Embodiment 2

The above-mentioned embodiment has not taken into consideration the case where the external load is exerted during the tailing mode. In the tailing mode immediately after the mode of the compression stroke injection is shifted to the mode of the intake stroke injection, however, the air-to-fuel-ratio clipping means 86 and the parameter correction means 88 may be invalidated in order to maintain stability in the control operation.

An embodiment 2 of the present invention will now be described with reference to the drawings.

Figure 5:
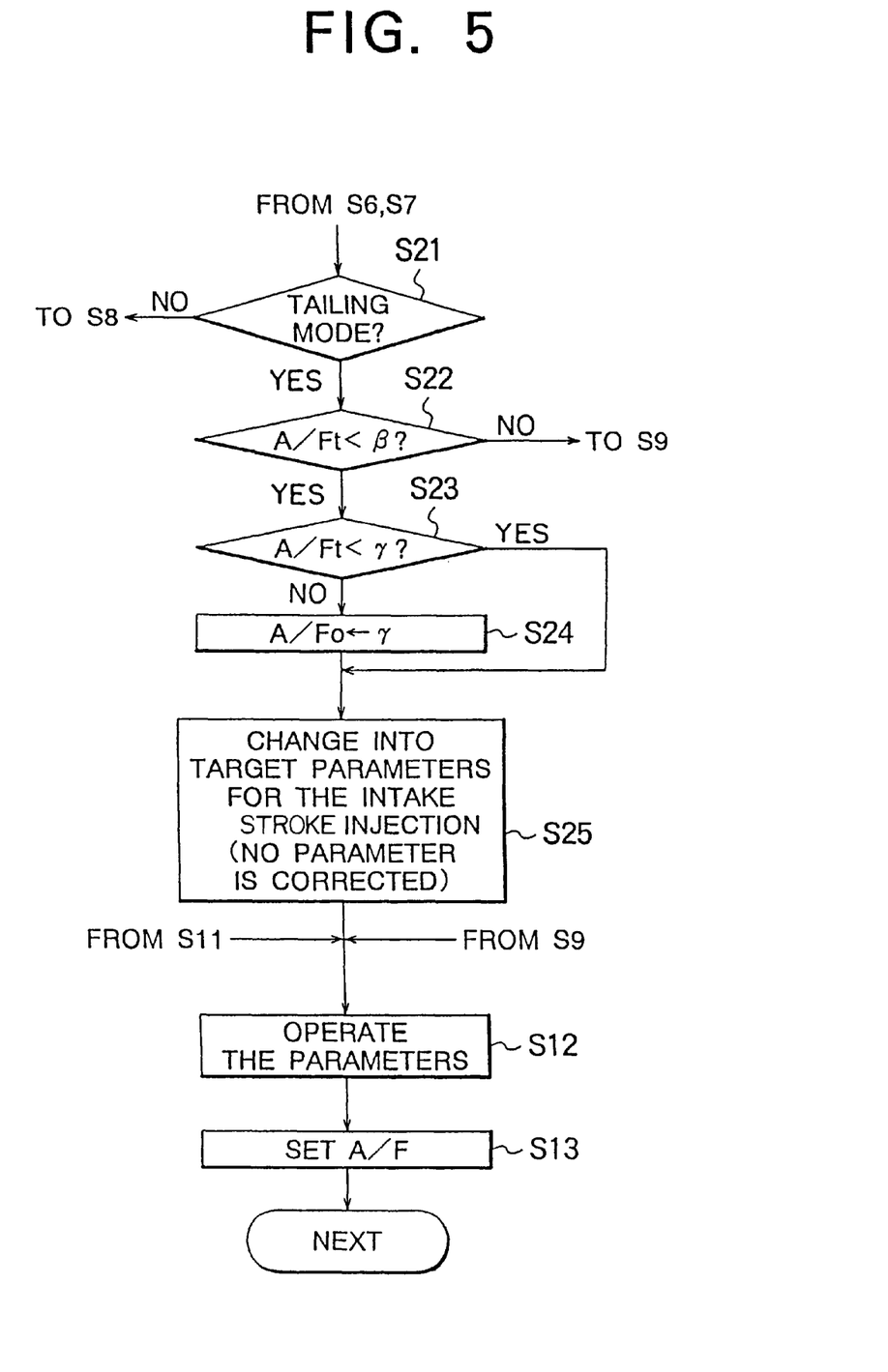
FIG. 5 is a flow chart illustrating a control sequence operation according to an embodiment 2 of the present invention.
Figure 6:
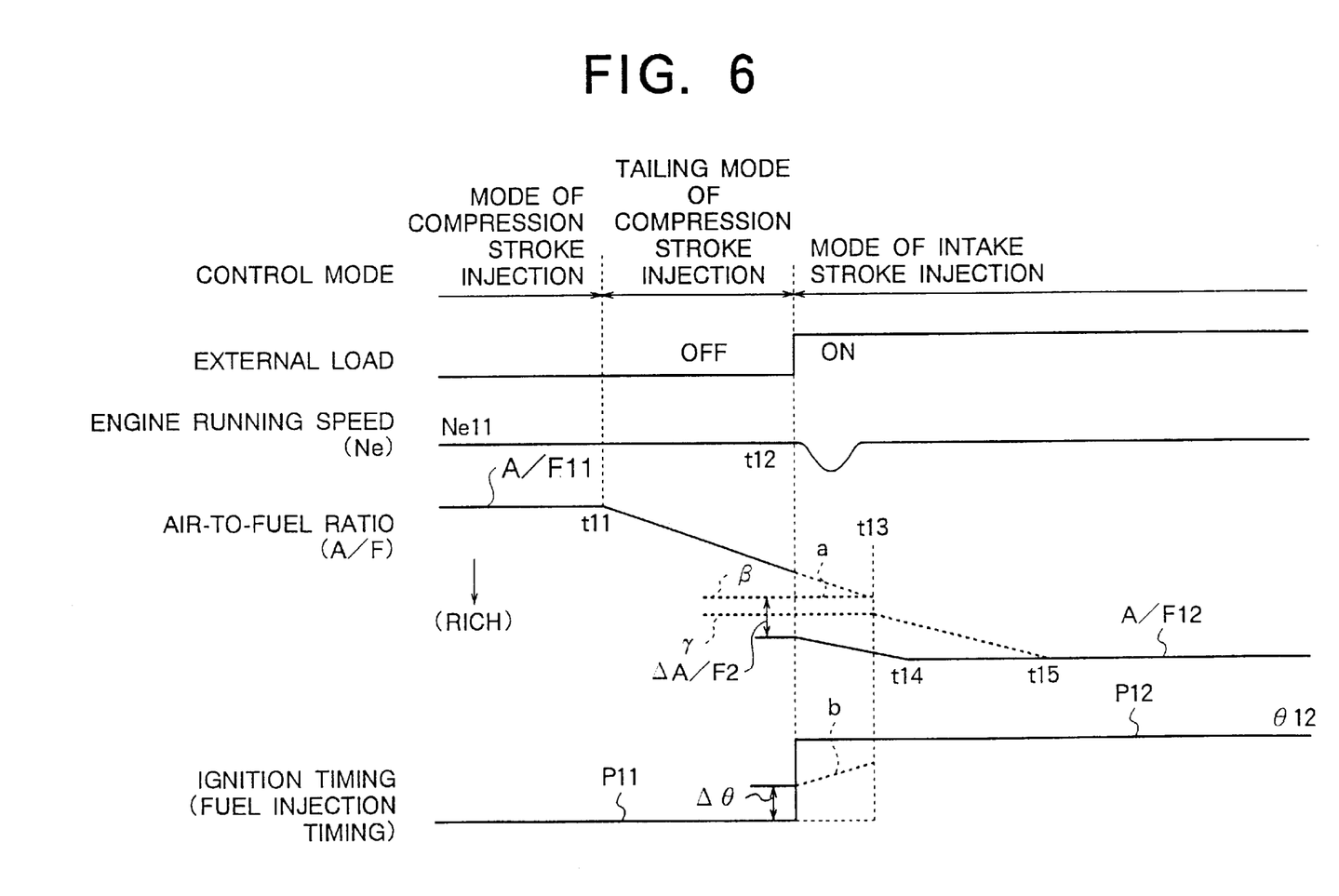
FIG. 6 is a timing chart for explaining the control sequence according to the embodiment 2 of the present invention.

FIG. 5 is a flow chart illustrating the control sequence operation according to the embodiment 2 of the present invention, and FIG. 6 is a timing chart for explaining the control sequence operation according to the embodiment 2 of the present invention.

In this case, the control circuit 8B in FIG. 1 sets a first threshold value β (hereinafter simply referred to as "threshold value") corresponding to the air-to-fuel ratio region where the combustion loses stability and a second threshold value γ (hereinafter simply referred to as "threshold value") on the side more rich than the threshold value β, and includes a tailing mode determining means and a parameter correction inhibiting means (not shown).

When the target air-to-fuel ratio A/Fo has suddenly decreased to the side more rich than the threshold value β due to a change in the external load in the tailing mode of the compression stroke injection, the control circuit 8B instantaneously shifts the tailing mode of the compression stroke injection into the tailing mode of the intake stroke injection, so that the controlled air-to-fuel ratio A/F is set to the side more rich than the threshold value γ.

In FIG. 5, the steps S1 to S11 are the same as those mentioned earlier (see FIG. 2), and are not diagramed here. The steps S11 and S12 are the same as those mentioned in the foregoing, too.

Referring to FIG. 6, the air-to-fuel ratio A/F is shifted from an initial value A/F11 in the mode of the compression stroke injection into a target value A/F12 in the mode of the intake stroke injection via the tailing mode.

The air-to-fuel ratio region in which the combustion loses stability is specified by the threshold values β and γ, and no controlled air-to-fuel ratio A/F can be set within the range of between the threshold values β and γ.

The amount of deviation ΔA/F2 in the air-to-fuel ratio is the amount of shift in the air-to-fuel ratio of when the external load is exerted, and is set to a value which is capable of skipping the region where the combustion loses stability.

The tailing mode of the compression stroke injection starting from a time t11 is shifted to the tailing mode of the intake stroke injection at a time t13 (see a broken line) when no external load is exerted. Here, the tailing mode of the intake stroke injection is executed during a period (see a broken line) of from the time t13 to a time t15.

When the external load is exerted at the time t12 during the tailing mode of the compression stroke injection, the tailing mode of the compression stroke injection is instantaneously shifted to the tailing mode of the intake stroke injection (see a solid line). In this case, the tailing mode of the intake stroke injection is executed during a period of from the time t12 to a time t14.

Referring to FIG. 6, the control circuit 8B, first, corrects the air-to-fuel ratio (steps S6, S7) in the mode of the compression stroke injection (lean) depending upon the external load, and the tailing mode determining means determines whether the tailing mode is being assumed or not (step S21).

When it is determined that the tailing mode is not being assumed (i.e., NO), the program proceeds to the step S8 (see FIG. 2) where the above-mentioned processing is executed, and the program proceeds to the step S12.

When it is determined that the tailing mode is being assumed (i.e., YES), then, it is determined whether the target air-to-fuel ratio A/Ft in the tailing mode is smaller (more rich) than the threshold value β or not (step S22).

When it is determined that A/Ft≧β (i.e., NO), the above-mentioned amount of correction is cleared into 0 at the step S9 (see FIG. 2), and the program proceeds to the step S12.

When it is determined that A/Ft<β (i.e., YES), it is then determined whether the target air-to-fuel ratio A/Ft in the tailing mode is smaller (more rich) than the threshold value γ or not (step S23).

When it is determined that A/Ft<γ (i.e., YES), the program proceeds to a step S25. When it is determined that the target air-to-fuel ratio A/Ft is on the side more lean than the threshold value γ and that A/Ft≧γ (i.e., NO), then, the target air-to-fuel ratio A/Fo is set to the threshold value γ on the rich side (step S24). Thus, the target air-to-fuel ratio A/Fo is accomplished avoiding the unstable region.

Then, at the step S25, the control parameters such as ignition timing, etc. are changed from the target parameter values for the compression stroke injection into the target parameter values for the intake stroke injection, and the program proceeds to the step S12. In this case, no parameter is corrected.

When no external load is exerted, the ignition timing (control parameter) in FIG. 6 is shifted from a target value P11 for the compression stroke injection into a target value P12 for the intake stroke injection at the time t13 as indicated by a broken line. When the external load is exerted, the target value P11 is shifted into the target value P12 for the intake stroke injection at the time t12 as indicated by a solid line.

Let it now be presumed that the external load is exerted at the time t12 during the tailing mode. In this case, if the air-to-fuel ratio A/F is clipped to the threshold value B and the ignition timing is corrected by a correction amount Δθ as indicated by dot-dash chain lines a and b, it becomes difficult to carry out linear control operation since the target reference value is tailing. After all, the control operation loses stability, and the correction tends to become excessive.

Upon instantaneously shifting into the tailing mode of the intake stroke injection when the external load is exerted to thereby inhibit the correction of parameters as described above, however, it is made possible to reliably avoid the state where the control operation loses stability.

I claim:

1. An inter-cylinder-injection fuel controller for an internal combustion engine comprising:

various sensors for outputting data representing operation conditions of the internal combustion engine;

injectors for directly injecting the fuel into the cylinders of the internal combustion engine; and a control unit for operating the amounts of fuel supplied into the cylinders based upon the operation conditions and for controlling the injectors in a mode of the compression stroke injection or in a mode of the intake stroke injection based upon the amounts of supplying fuel; wherein said various sensors include an amount-of-intaken-air sensor for outputting data that corresponds to the amount of the air intaken by the internal combustion engine, and a crank angle sensor for outputting data that correspond to the running speed of the internal combustion engine and to the crank angle; and said control unit includes:
- a change-in-the-running-speed suppressing means for suppressing a change in the running speed caused by a change in the external load in the mode of the compression stroke injection by correcting the amount of supplying fuel;
- a rich determining means for forming a rich signal when a target air-to-fuel ratio based upon the corrected amount of supplying fuel is on the side more rich than a predetermined lower-limit value;
- an air-to-fuel-ratio clipping means for clipping the control led air-to-fuel ratio of the internal combustion engine to the lower-limit value in response to the rich signal;
- an amount-of-deviation operation means for operating the amount of deviation between the lower-limit value and the target air-to-fuel ratio in response to the rich signal; and
- a parameter correction means for correcting control parameters of the internal combustion engine toward the direction of increasing the output depending upon the amount of deviation.

2. An inter-cylinder-injection fuel controller for an internal combustion engine according to claim 1, wherein said control parameters include at least any one of an ignition timing for the internal combustion engine, a timing for driving the injector or an amount of the intaken air.

3. An inter-cylinder-injection fuel controller for an internal combustion engine according to claim 1, wherein said control unit invalidates the air-to-fuel-ratio clipping means and the parameter correction means in a tailing mode just after the mode of the compression stroke injection is shifted to the mode of the intake stroke injection.

4. An inter-cylinder-injection fuel controller for an internal combustion engine according to claim 3, wherein said control unit sets a first threshold value corresponding to an air-to-fuel-ratio region in which the combustion loses stability and a second threshold value which is on the side more rich than the first threshold value, and, when the target air-to-fuel ratio has suddenly changed from the first threshold value to the rich side due to a change in the external load in a tailing mode of the compression stroke injection, instantaneously shifts the tailing mode of the compression stroke injection to a tailing mode of the intake stroke injection, and sets the controlled air-to-fuel ratio to the side more rich than the second threshold value.

* * * * *